US010120742B2

(12) United States Patent
Ueda et al.

(10) Patent No.: US 10,120,742 B2
(45) Date of Patent: Nov. 6, 2018

(54) POWER SUPPLY CONTROLLER SYSTEM AND SEMICONDUCTOR DEVICE

(71) Applicant: OMRON Corporation, Kyoto (JP)

(72) Inventors: Takamasa Ueda, Kusatsu (JP); Yasuo Muneta, Kusatsu (JP)

(73) Assignee: OMRON Corporation, Kyoto (JP)

( * ) Notice: Subject to any disclaimer, the term of this patent is extended or adjusted under 35 U.S.C. 154(b) by 61 days.

(21) Appl. No.: 15/499,905

(22) Filed: Apr. 28, 2017

(65) Prior Publication Data

US 2017/0344418 A1 Nov. 30, 2017

(30) Foreign Application Priority Data

May 27, 2016 (JP) .................................. 2016-106229

(51) Int. Cl.
| | |
|---|---|
| *G06F 11/00* | (2006.01) |
| *G06F 11/07* | (2006.01) |
| *G06F 1/30* | (2006.01) |
| *G06F 9/4401* | (2018.01) |
| *G06F 1/28* | (2006.01) |

(52) U.S. Cl.
CPC ............ *G06F 11/0757* (2013.01); *G06F 1/28* (2013.01); *G06F 1/30* (2013.01); *G06F 9/442* (2013.01); *G06F 11/0721* (2013.01); *G06F 11/0793* (2013.01); *G05B 2219/24125* (2013.01)

(58) Field of Classification Search
CPC ... G06F 9/442; G06F 2201/86; G06F 11/1441
USPC ..................................................... 714/22, 24
See application file for complete search history.

(56) References Cited

U.S. PATENT DOCUMENTS

| | | | |
|---|---|---|---|
| 2007/0285950 A1 | 12/2007 | Nakamura et al. | |
| 2009/0119528 A1* | 5/2009 | Yang ..................... | G06F 1/3203 |
| | | | 713/323 |
| 2010/0235558 A1 | 9/2010 | Snead | |

(Continued)

FOREIGN PATENT DOCUMENTS

| | | |
|---|---|---|
| EP | 1843247 | 10/2007 |
| EP | 1857900 | 11/2007 |
| JP | 2007310693 | 11/2007 |

OTHER PUBLICATIONS

"Search Report of Euorpe Counterpart Application", dated Jul. 28, 2017, p. 1-11, in which the listed references were cited.

*Primary Examiner* — Sarai E Butler
(74) *Attorney, Agent, or Firm* — JCIPRNET

(57) ABSTRACT

A power supply controller system includes a power supply portion, arithmetic processing portions, and first and second monitoring circuits configured to monitor an integrity of power supply of the power supply portion. The first monitoring circuit instructs a second arithmetic processing portion to stop an operation thereof when a first watchdog timer is not reset for a predetermined period of time. The second monitoring circuit instructs a first arithmetic processing portion to stop an operation thereof when a second watchdog timer is not reset for a predetermined period of time. The first monitoring circuit further includes a third watchdog timer periodically reset by any one of the first arithmetic processing portion and the second arithmetic processing portion and instructs another arithmetic processing portion to stop an operation thereof when the third watchdog timer is not reset for a predetermined period of time.

5 Claims, 4 Drawing Sheets

(56) References Cited

U.S. PATENT DOCUMENTS

2012/0041638 A1* 2/2012 Johnson ............... G07C 5/008
 701/33.1
2013/0246866 A1* 9/2013 Costin ................ B60W 50/04
 714/55

* cited by examiner

POWER SUPPLY CONTROLLER SYSTEM AND SEMICONDUCTOR DEVICE

CROSS-REFERENCE TO RELATED APPLICATION

This application claims the priority benefit of Japan application serial no. 2016-106229, filed on May 27, 2016. The entirety of the above-mentioned patent application is hereby incorporated by reference herein and made a part of this specification.

BACKGROUND OF THE INVENTION

Field of the Invention

This technology relates to a power supply controller system in which power is supplied from a power supply portion to a plurality of arithmetic processing portions and a semiconductor device used in the power supply controller system.

Description of Related Art

In order to safely use machines disposed at manufacturing sites and the like, safety devices (safety components) according to international standards need to be used. Safety devices may include safety controllers configured to execute safety programs and are for the purpose of preventing automatically operating devices such as robots from threatening human safety. Such safety devices need high reliability.

In such a controller and the like in which high reliability is required, a configuration in which arithmetic processes or the like are multiplexed may be adopted and a function in which a device can be safely stopped by mutually monitoring operations even if a failure occurs due to any reason, that is, a failsafe function is incorporated in many cases.

For example, Japanese Patent Publication No. 2007-310693 discloses a building block type safety controller in which an arbitrary number of input and output (IO) units can be connected to one IO control unit. In the safety controller, an IO power shutdown means provided in an IO control unit is configured to perform a shutdown operation for any of when a power voltage for IO power supply supplied to the unit is outside of a prescribed range, when a power supply voltage for an internal circuit of the unit is outside of a prescribed range, when a microprocessor constituting an internal circuit of the unit has detected hardware abnormality, and when a watchdog timer of the microprocessor constituting the internal circuit of the unit has timed out.

PRIOR ART LITERATURE

Patent Literature

Patent Literature 1: Japanese Patent Publication No. 2007-310693

In the safety controller disclosed in Japanese Patent Publication No. 2007-310693, a configuration in which two microprocessors (MPUs) mutually monitor through cross communication and a watchdog timer circuit (WDT circuit) which is separately disposed monitors one of the MPUs is adopted.

In the configuration disclosed in Japanese Unexamined Patent Application Publication No. 2007-310693, a process of mutually performing monitoring needs to be incorporated into a program executed in the MPUs and thus there is a problem in that difficulty of software development increases and a hardware mounting area becomes larger due to the watchdog timer circuit.

SUMMARY OF THE INVENTION

This technology prevents difficulty of software development from increasing and a hardware mounting area from becoming larger even in a configuration in which this monitoring function is required.

A power supply controller system according to an aspect of this technology includes: a power supply portion; a first arithmetic processing portion and s second arithmetic processing portion configured to receive power from the power supply portion and operate; and a first monitoring circuit and a second monitoring circuit configured to monitor an integrity of power supply of the power supply portion, wherein the first monitoring circuit includes a first watchdog timer periodically reset by the first arithmetic processing portion and instructs the second arithmetic processing portion to stop an operation thereof when the first watchdog timer is not reset for a predetermined period of time, the second monitoring circuit includes a second watchdog timer periodically reset by the second arithmetic processing portion and instructs the first arithmetic processing portion to stop an operation thereof when the second watchdog timer is not reset for a predetermined period of time, and the first monitoring circuit further includes a third watchdog timer periodically reset by any one of the first arithmetic processing portion and the second arithmetic processing portion and instructs another arithmetic processing portion to stop an operation thereof when the third watchdog timer is not reset for a predetermined period of time.

According to an embodiment, the first monitoring circuit may include a first power supply monitoring portion configured to monitor an integrity of the power supply portion configured to supply power to the first arithmetic processing portion and the second arithmetic processing portion and may instruct the first arithmetic processing portion and the second arithmetic processing portion to stop operations thereof if the first power supply monitoring portion detects that an abnormality has occurred in the power supply portion, and the second monitoring circuit may include a second power supply monitoring portion configured to monitor an integrity of the power supply portion configured to supply power to the first arithmetic processing portion and the second arithmetic processing portion and may instruct the first arithmetic processing portion and the second arithmetic processing portion to stop operations thereof if the second power supply monitoring portion detects that an abnormality has occurred in the power supply portion.

According to an embodiment, the first power supply monitoring portion and the second power supply monitoring portion may be constituted of semiconductor devices manufactured by different processes.

According to an embodiment, the watchdog timers may not be mounted in the first arithmetic processing portion and the second arithmetic processing portion.

Another aspect of this technology is a semiconductor device which monitors an integrity of power supply of a power supply portion and an integrity of a first arithmetic processing portion and a second arithmetic processing portion in a power supply controller system including the first arithmetic processing portion and the second arithmetic processing portion receiving power from the power supply portion and operating, the semiconductor device including:

a first watchdog timer periodically reset by the first arithmetic processing portion; a second watchdog timer periodically reset by the second arithmetic processing portion; a power supply monitoring portion configured to monitor an integrity of the power supply portion; and a controller, wherein the controller instructs the second arithmetic processing portion to stop an operation thereof when the first watchdog timer is not reset for a predetermined period of time, instructs the first arithmetic processing portion to stop an operation thereof when the second watchdog timer is not reset for a predetermined period of time, and instructs the first arithmetic processing portion and the second arithmetic processing portion to stop operations thereof if the power supply monitoring portion detects that an abnormality has occurred in the power supply portion.

According to this technology, difficulty of software development can be prevented from increasing and a hardware mounting area can be prevented from becoming larger even in a configuration in which this monitoring function is required.

DESCRIPTION OF EMBODIMENTS

Figure 1:
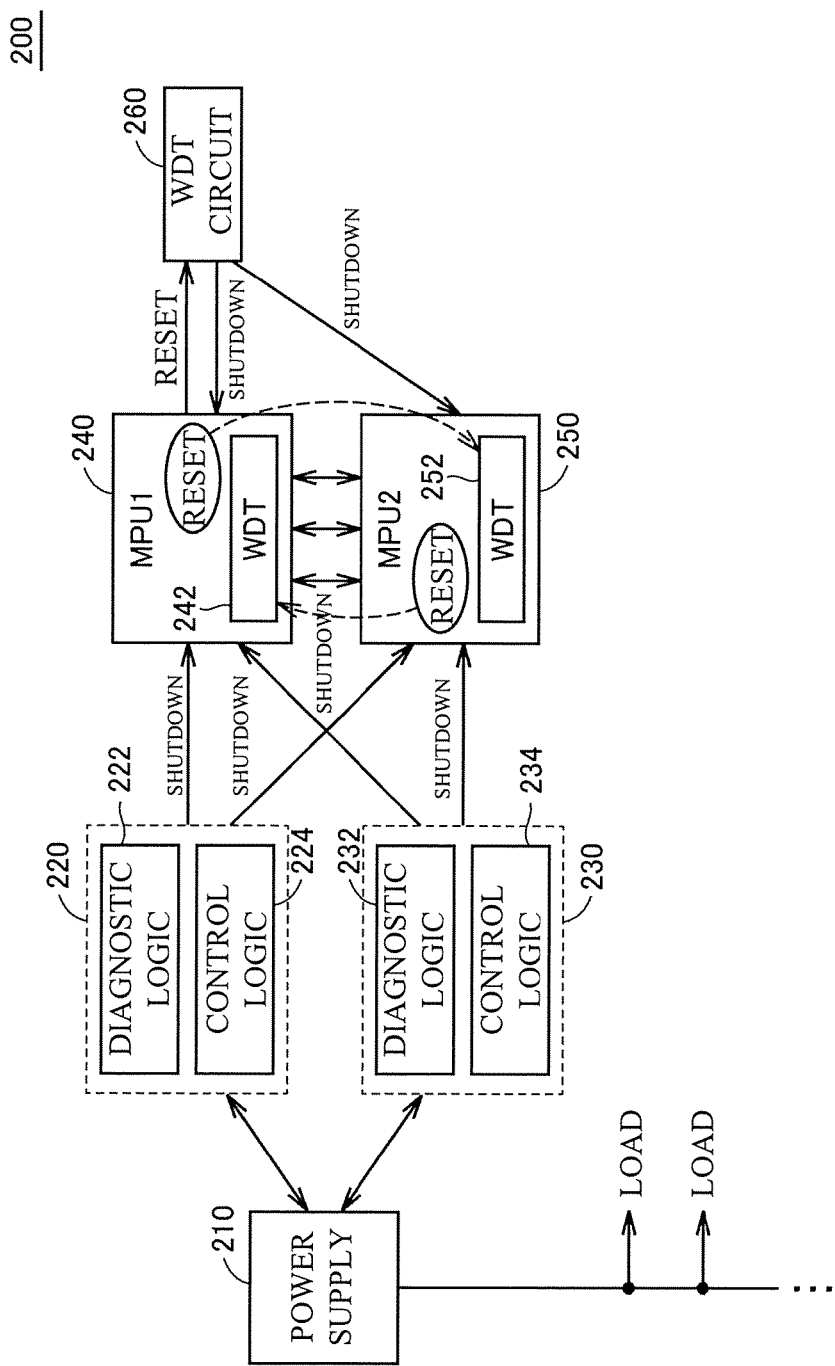
FIG. 1 is a schematic diagram showing a main configuration of a controller system according to associated technology of the disclosure.

Embodiments of the disclosure will be described in detail with reference to the drawings. Note that the same or corresponding parts in the drawing are denoted with the same reference numerals and the repeated descriptions thereof will be omitted.

A. Associated Technology

First, technology associated with a controller system according to an embodiment will be described.

FIG. 1 is a schematic diagram showing a main configuration of a controller system according to the associated technology of the disclosure. Referring to FIG. 1, a controller system 200 according to the associated technology of the disclosure typically takes the responsibility of executing a process related to safety control and a multiplexing system in which a plurality of arithmetic processing portions substantially execute the same program in parallel is adopted for a controller system 200.

The controller system 200 includes a power supply portion 210, monitoring circuits 220 and 230, microprocessor (MPU1) 240 and microprocessor (MPU2) 250, and a watchdog timer (WDT) circuit 260.

The power supply portion 210 includes a voltage converting circuit such as switching regulator, a power supply stabilizing circuit and the like, and supplies power with one or more voltages to loads which are inside or outside the controller system 200. The monitoring circuits 220 and 230 are circuits configured to monitor an integrity of power supply of the power supply portion 210 and stop operations of the microprocessors 240 and 250 when abnormality occurs in the power supply portion 210. The monitoring circuit 220 includes a diagnostic logic 222 and a control logic 224 and the monitoring circuit 230 includes a diagnostic logic 232 and a control logic 234. The diagnostic logics 222 and 232 monitor internal information, an output voltage and/or the like of the power supply portion 210 to determine the presence or absence of abnormality in the power supply portion 210. The control logics 224 and 234 output a shutdown instruction to the microprocessors 240 and 250 if abnormality of the power supply portion 210 is detected using the diagnostic logics 222 and 232.

Each of the monitoring circuits 220 and 230 can independently stop operations of both of the microprocessors 240 and 250. The monitoring circuits 220 and 230 can be multiplexed to monitor the power supply portion 210 even if any one of the monitoring circuits 220 and 230 fails.

The microprocessors 240 and 250 execute an operating system (OS) which is stored in advance, a user program, and the like in parallel. In the configuration shown in FIG. 1, watchdog timers 242 and 252 are mounted in the microprocessors 240 and 250, respectively and the microprocessors 240 and 250 can communicate with each other. The microprocessor 240 periodically resets the watchdog timer 252 of the microprocessor 250 and the microprocessor 250 periodically resets the watchdog timer 242 of the microprocessor 240. The presence or absence of abnormality can be monitored for in the microprocessors mutually using these watchdog timers 242 and 252.

In other words, since the watchdog timer 252 of the microprocessor 250 is not reset if any abnormality occurs in the microprocessor 240 and an operation thereof stops, the microprocessor 250 can detect occurrence of abnormality in the microprocessor 240. Similarly, since the watchdog timer 242 of the microprocessor 240 is not reset if any abnormality occurs in the microprocessor 250 and an operation thereof stops, the microprocessor 240 can detect occurrence of abnormality in the microprocessor 250.

Here, in a case in which the microprocessors 240 and 250 are in the same semiconductor device and the like, when there is a problem in a commonly executed user program itself with a unique cause in the semiconductor device, and the like, abnormality is likely to occur in both of the microprocessors 240 and 250. In other words, common cause failures are likely to occur in the microprocessors 240 and 250.

In the configuration shown in FIG. 1, the watchdog timer circuit 260 is provided in consideration of such common cause failures. The watchdog timer circuit 260 has a watchdog timer which is periodically reset through the microprocessor 240. If a value of the watchdog timer is not reset for a predetermined period of time, the watchdog timer circuit 260 can detect that abnormality occurs in the microprocessor 240. The watchdog timer circuit 260 outputs a shutdown instruction to the microprocessors 240 and 250 if it is detected that abnormality has occurred in the microprocessor 240.

As shown in FIG. 1, in the controller system 200 according to the associated technology of the disclosure, the plurality of microprocessors 240 and 250 are mounted to take the responsibility of the process related to safety control even when any component has failed. A configuration in which the watchdog timers 242 and 252 are mounted in the microprocessors 240 and 250, respectively, to mutually monitor each other is adopted in adopting such a multiplexing system.

Also, in the configuration shown in FIG. 1, when any abnormality has occurred in the power supply portion 210, a circuit configured to monitor the power supply portion 210 and a circuit configured to stop the entire controller system 200 including the microprocessors 240 and 250 are required to safely stop the controller system 200. When such circuits associated with the monitoring and the like of the power supply portion 210 are applied to the configuration in which the plurality of microprocessors are mounted, as shown in FIG. 1, a method of multiplexing the identical devices is generally performed to reduce difficulty of software development.

Here, it is necessary to deal with a failure mode due to common cause failures such as a problem unique to the device in the method of multiplexing the identical devices. In other words, a situation in which a plurality of devices stop at the same time may occur due to causes commonly present in the plurality of devices.

As a countermeasure for such common cause failures, in the configuration shown in FIG. 1, the watchdog timer circuit 260 is provided as a monitoring mechanism independently of the multiplexed monitoring mechanism.

Although high reliability can be realized by adopting the configuration shown in FIG. 1, an independent monitoring mechanism is provided so that a problem may arise in that a hardware mounting area is enlarged and complexity of a circuit is increased. Furthermore, since software configured to control a plurality of monitoring mechanisms is required separately, a problem may arise in that resources which can be assigned to the original process among resources included in a device are restricted and thus sufficient performance may not be exhibited and a program may not be able to be made compact.

Thus, the embodiment is for the purpose of assigning more resources for performance of the microprocessors in executing the original program and preventing difficulty of software development from increasing. Furthermore, the embodiment is also for the purpose of preventing the hardware mounting area of the entire controller system 200 from enlarging.

B. Circuit Configuration

Next, technology associated with the controller system according to the embodiment will be described.

Figure 2:
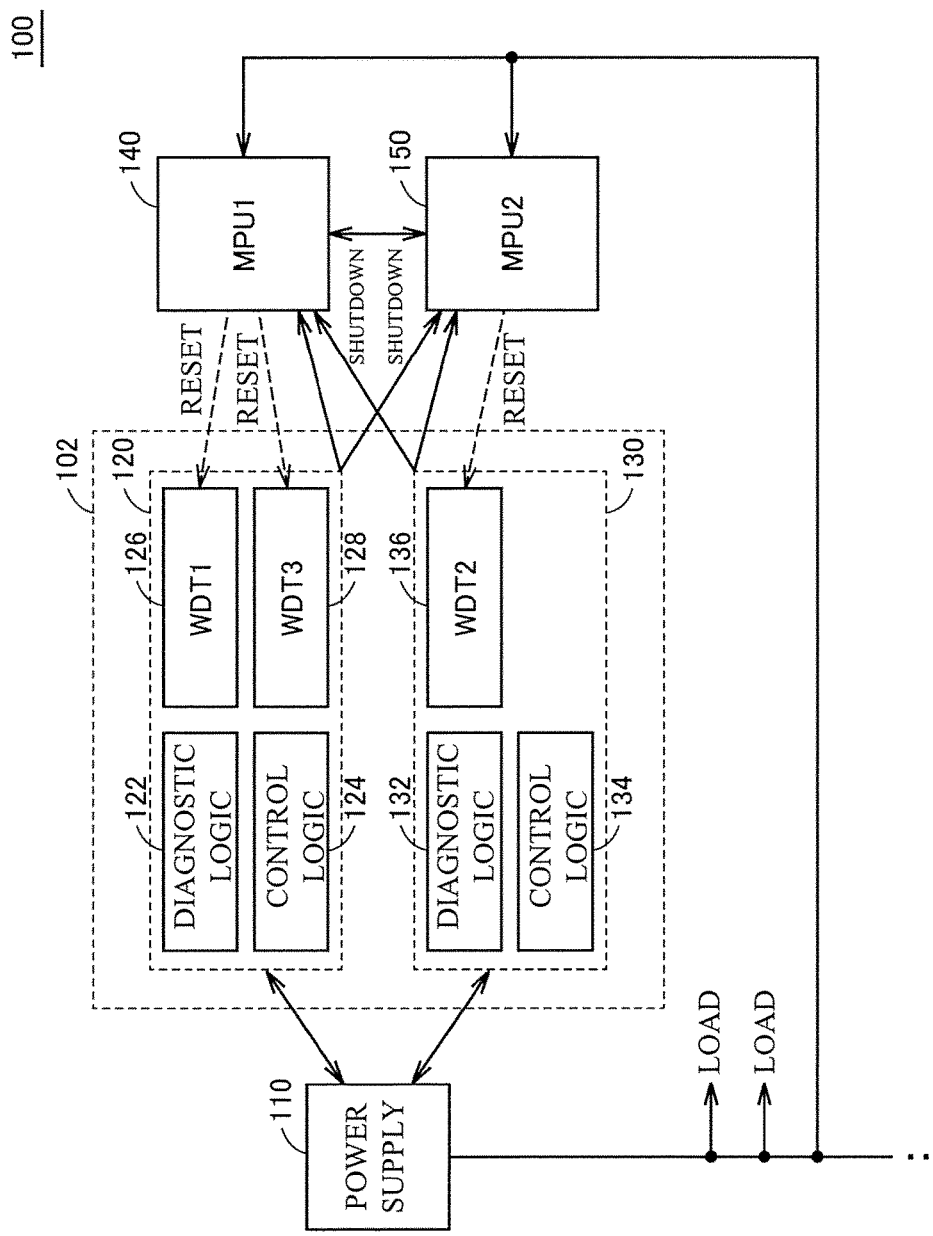
FIG. 2 is a schematic diagram showing a main configuration of a controller system according to an embodiment.

FIG. 2 is a schematic diagram showing a main configuration of a controller system 100 according to the embodiment. Referring to FIG. 2, the controller system 100 according to the embodiment typically takes the responsibility of executing a process related to safety control and a multiplexing system in which a plurality of arithmetic processing portions substantially execute the same program in parallel is adopted for the controller system 100.

The controller system 100 includes a power supply portion 110, monitoring circuits 120 and 130, and microprocessors (MPU1) 140 and microprocessors (MPU2) 150.

The power supply portion 110 includes a voltage converting circuit, a power supply stabilizing circuit, and the like serving as switching regulators and supplies power with one or more voltages to loads which are inside or outside the controller system 100. The power supply portion 110 supplies generated power to the microprocessors 140 and 150. Furthermore, the power supply portion 110 may supply power to an input and output (IO) unit or the like (not shown).

The monitoring circuits 120 and 130 are circuits configured to monitor an integrity of power supply of the power supply portion 110 and stop operations of the microprocessors 140 and 150 when abnormality occurs in the power supply portion 110. The monitoring circuit 120 includes a diagnostic logic 122, a control logic 124, and two watchdog timers (WDT1 and WDT3) 126 and 128. The monitoring circuit 130 includes a diagnostic logic 132, a control logic 134, and a watchdog timer (WDT2) 136.

Each of the monitoring circuits 120 and 130 may be package as a single semiconductor device and the monitoring circuit 120 and the monitoring circuit 130 may be integrally packaged as a single semiconductor device 102. The semiconductor device 102 may be an integrated circuit (IC), a large scale integrated circuit (LSI), or the like and may be an application specific integrated circuit (ASIC), a system on chip (SOC), and the like. Alternatively, the semiconductor device 102 may be a circuit using a field-programmable gate array (FPGA) or the like.

The diagnostic logics 122 and 132 monitor internal information, an output voltage, and/or the like of the power supply portion 110 to determine the presence or absence of abnormality in the power supply portion 210.

The control logic 124 outputs a shutdown instruction to the microprocessors 140 and 150 if the diagnostic logic 122 detects that any abnormality has occurred in the power supply portion 110. Furthermore, the control logic 124 outputs a shutdown instruction to the microprocessor 150 if values of the watchdog timers 126 and 128 are not reset for a predetermined period of time. A process of outputting a shutdown instruction due to the values of the watchdog timers 126 and 128 will be described later.

The control logic 134 outputs a shutdown instruction to the microprocessors 140 and 150 if the diagnostic logic 132 detects that any abnormality has occurred in the power supply portion 110. Furthermore, the control logic 134 outputs a shutdown instruction to the microprocessor 140 if a value of the watchdog timer 136 is not reset for a predetermined period of time. A process of outputting a shutdown instruction due to the value of the watchdog timer 136 will be described later.

A shutdown instruction is an instruction used to safely stop a program executed by the microprocessors 140 and 150 and can adopt an arbitrary implementation form. For example, wiring may be performed such that a shutdown instruction is given to interrupt ports of the microprocessors 140 and 150 and a predetermined shutdown process may be executed if a shutdown instruction is input to the interrupt ports. Alternatively, wiring may be performed such that a shutdown instruction is given to peripheral circuits of the microprocessors 140 and 150 and the peripheral circuits may execute a process required for shutting down the microprocessors 140 and 150.

The microprocessors 140 and 150 are examples of arithmetic processing portions configured to execute a program. As specific devices for the microprocessors 140 and 150, a central processing unit (CPU), a graphics processing unit (GPU), and the like may be used. The microprocessors 140 and 150 receive power from the power supply portion 110 and operate. The microprocessors 140 and 150 constitute mutually multiplexed arithmetic processing portions and execute substantially the same program. The microprocessor 140 and the microprocessor 150 mutually exchange information used for safely cooperating with each other when abnormality has occurred in the monitoring circuit 120 or the monitoring circuit 130, which will be described later.

The watchdog timer (WDT1) 126 is periodically reset by the microprocessor 140. The monitoring circuit 120 (the control logic 124) outputs a shutdown instruction to the microprocessor 150 and instructs the microprocessor 150 to stop an operation thereof when the watchdog timer 126 is not reset for a predetermined period of time.

Similarly, the watchdog timer (WDT2) 136 is periodically reset by the microprocessor 150. The monitoring circuit 130 (the control logic 134) outputs a shutdown instruction to the microprocessor 140 and instructs the microprocessor 140 to stop an operation thereof when the watchdog timer 136 is not reset for a predetermined period of time.

The resetting of the watchdog timers through the microprocessors 140 and 150 may be executed using a system program or a user program executed by the microprocessors 140 and 150 and may be executed by firmware, a basic input/output system (BIOS), or the like loaded in the microprocessors 140 and 150. Alternatively, a process of performing resetting may be provided as one function of a dedicated circuit disposed near the microprocessors 140 and 150.

The monitoring circuit 120 has the watchdog timer (WDT3) 128 periodically reset by any one of the microprocessor 140 and the microprocessor 150. The monitoring circuit 120 instructs a separate microprocessor from the microprocessor configured to reset the watchdog timer 128 to stop an operation thereof when the watchdog timer 128 is not reset for a predetermined period of time.

In the configuration shown in FIG. 2, the watchdog timer (WDT3) 128 is periodically reset by the microprocessor 140. The monitoring circuit 120 (the control logic 124) outputs a shutdown instruction to the microprocessor 150 and instructs the microprocessor 150 to stop an operation thereof when the watchdog timer 128 is not reset for a predetermined period of time. Note that, as will be described later, the watchdog timer (WDT3) 128 may be periodically reset by the microprocessor 150.

In the configuration example shown in FIG. 2, if any abnormality occurs in any one of the microprocessor 140 and microprocessor 150, a shutdown instruction is also output to the other microprocessor. Thus, even if any of an individual cause failure and a common cause failure occurs in the microprocessors 140 and 150, it can be handled. For this reason, as the microprocessors 140 and 150, substantially identical devices may be used. In other words, the microprocessors 140 and 150 may be devices manufactured by the same process.

On the other hand, the monitoring circuit 120 and the monitoring circuit 130 differ in a circuit configuration in at least the number of watchdog timers and thus a likelihood of occurrence of a common cause failure due to differences in the circuit configuration may be substantially zero. In other words, both of the monitoring circuit 120 and the monitoring circuit 130 can reduce a risk in which the circuits fail at the same time. In addition, the monitoring circuit 120 and the monitoring circuit 130 may be constituted of semiconductor devices manufactured by different processes. When manufacturing processes themselves differ as described above, the likelihood of occurrence of a common cause failure can be further reduced.

In the controller system 100 according to this embodiment, the monitoring circuit 120 and 130 are multiplexed in a state in which different configurations are adopted in the monitoring circuits 120 and 130 serving as monitoring mechanisms and thus a likelihood of occurrence of a common cause failure can be reduced. In addition, the configuration shown in FIG. 2 is adopted so that a watchdog timer need not be mounted in a microprocessor and software development can be further facilitated.

C. Behavior at the Time of Occurrence of Abnormality

Next, a behavior when an abnormality has occurred in the controller system 100 according to the embodiment will be described. FIGS. 3A to 3D are schematic diagrams for describing behaviors of portions when an abnormality has occurred in the controller system 100 according to the embodiment.

Figure 3A:
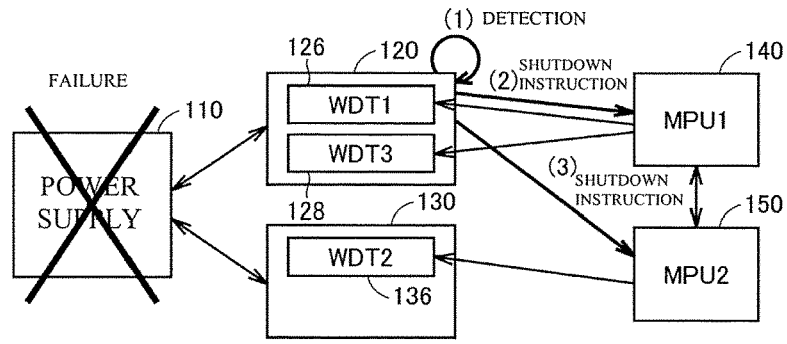
FIGS. 3A to 3D are schematic diagrams for describing behaviors of portions when an abnormality has occurred in the controller system according to the embodiment.

FIG. 3A illustrates a case in which an abnormality has occurred in the power supply portion 110. In this case, the monitoring circuit 120 (the diagnostic logic 122 of FIG. 2) outputs a shutdown instruction to the microprocessors 140 and 150 if the monitoring circuit 120 detects that an abnormality has occurred in the power supply portion 110. As a result, the microprocessors 140 and 150 execute a necessary safety process of stopping an operation and perform a shutdown. Note that the monitoring circuit 130 outputs a shutdown instruction to the microprocessors 140 and 150 instead of the monitoring circuit 120 in some cases and both of the monitoring circuit 120 and the monitoring circuit 130 output a shutdown instruction to the microprocessors 140 and 150 in some cases.

Figure 3B:
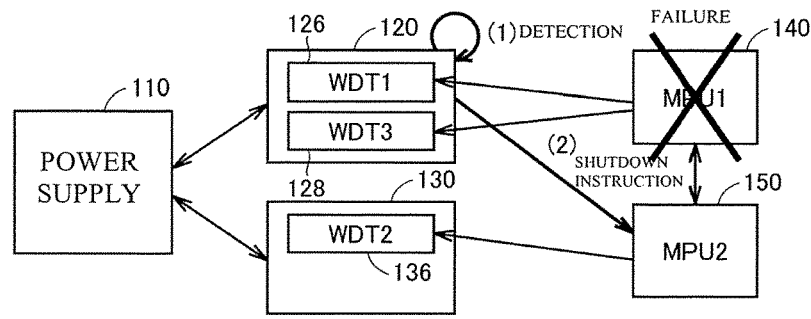

FIG. 3B illustrates a case in which an abnormality has occurred in the microprocessor 140. In this case, since values of the watchdog timers 126 and 128 are not reset, a period of time in which there has been no reset exceeds a predetermined period of time and thus the monitoring circuit 120 (the control logic 124 of FIG. 2) detects that there is an abnormality occurred in the microprocessor 140. Furthermore, the monitoring circuit 120 (the control logic 124 of FIG. 2) outputs a shutdown instruction to the microprocessor 150. As a result, the microprocessor 150 executes a necessary safety process of stopping an operation and performs a shutdown.

Note that the monitoring circuit 120 (the control logic 124 of FIG. 2) may also output a shutdown instruction to the microprocessor 140 in addition to the microprocessor 150.

On the other hand, since a value of the watchdog timer 136 is not reset when an abnormality has occurred in the microprocessor 150, the monitoring circuit 130 (the control logic 134 of FIG. 2) performs the same process and safely stops the microprocessors 140 and 150.

Figure 3C:
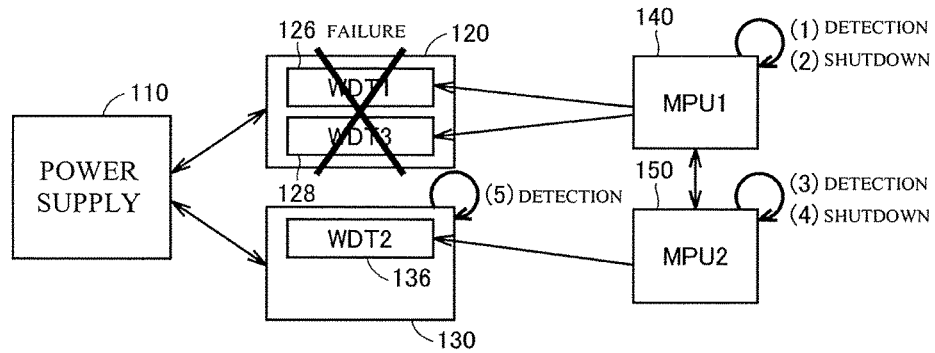

FIG. 3C illustrates a case in which an abnormality has occurred in the monitoring circuit 120. In this case, since values of the watchdog timers 126 and 128 are not incremented, the microprocessor 140 configured to write a reset signal detects that an abnormality has occurred in the monitoring circuit 120. Furthermore, the microprocessor 140 executes a necessary safety process of stopping an operation in accordance with its own protection function and performs a shutdown.

Also, the microprocessor 150 can periodically monitor a state of the microprocessor 140 and detect that the microprocessor 140 has shut down. The microprocessor 150 executes a necessary safety process of stopping an operation in accordance with its own protection function in response to the shutdown of the microprocessor 140 and the microprocessor 150 itself also shuts down. Thus, since a value of the watchdog timer 136 is not reset, the monitoring circuit 130 detects the shutdown of the microprocessors 140 and 150.

Figure 3D:
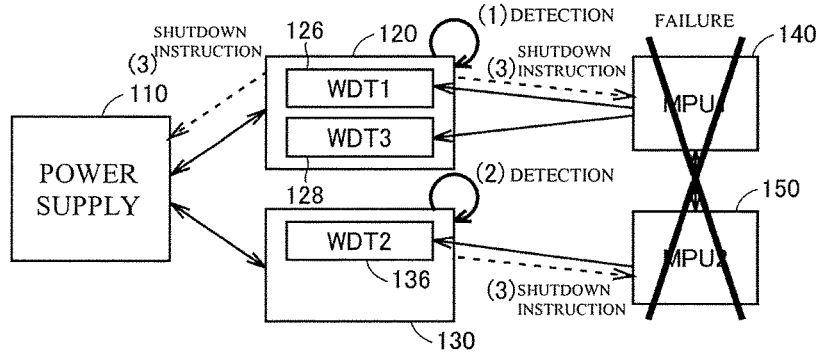

FIG. 3D illustrates a case in which the microprocessors 140 and 150 have stopped due to a common cause failure. In this case, since values of the watchdog timers 126 and 128 are not reset, a period of time in which there has been no reset exceeds a predetermined period of time and thus the monitoring circuit 120 (the control logic 124 of FIG. 2) detects that an abnormality has occurred in the microprocessor 140. Similarly, since a value of the watchdog timer 136 is not reset, a period of time in which there has been no reset exceeds a predetermined period of time and thus the monitoring circuit 130 (the control logic 134 of FIG. 2) detects that an abnormality has occurred in the microprocessor 150. In this case, the monitoring circuit 120 (the diagnostic logic 122 of FIG. 2) and the monitoring circuit 130 (the diagnostic logic 132 of FIG. 2) output a shutdown instruction to at least one of the microprocessors 140 and 150 and the power supply portion 110 in accordance with details of the detected abnormality.

For example, when detected abnormality is caused by values of the watchdog timers 126, 128, and 136 which cannot be reset due to a simple program error or the like, the microprocessors 140 and 150 give a shutdown instruction to both or one of the microprocessors 140 and 150. Furthermore, when content of the detected abnormality includes a state in which both of the microprocessors 140 and 150 cannot be controlled or the like, a shutdown instruction is given to the power supply portion 110. In the case of another cause and the like, a shutdown instruction may be given to all of the power supply portion 110 and the microprocessors 140 and 150.

The entire controller system 100 according to the embodiment can be safely stopped in accordance with the behavior described above irrespective of a place in which an abnormality occurs.

D. Modified Example

Although a configuration in which the microprocessor 140 periodically resets the values of the two watchdog timers (WDT1 and WDT3) 126 and 128 of the monitoring circuit 120 is exemplified in the above-described embodiment, a configuration in which different microprocessors reset a plurality of watchdog timers may be adopted.

Figure 4:
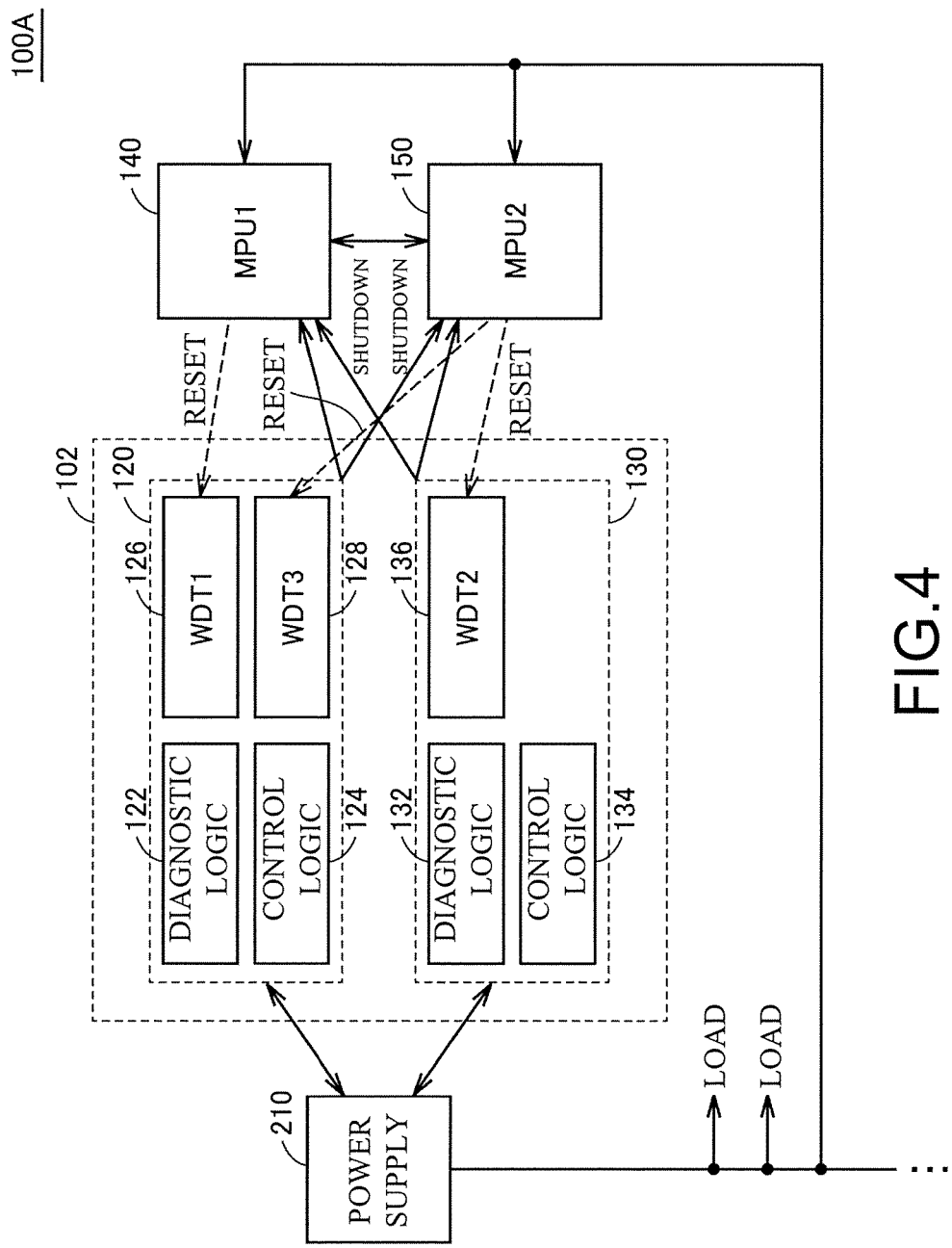
FIG. 4 is a schematic diagram showing a main configuration of a controller system according to a modified example of the embodiment.

FIG. 4 is a schematic diagram showing a main configuration of a controller system 100A according to a modified example of the embodiment. Refer to FIG. 4, in the controller system 100A according to the embodiment, while a watchdog timer (WDT1) 126 of a monitoring circuit 120 is periodically reset by a microprocessor 140, a watchdog timer (WDT3) 128 of the monitoring circuit 120 is periodically reset by a microprocessor 150.

In other words, in the controller system 100A shown in FIG. 4, the watchdog timer (WDT3) 128 is periodically reset by the microprocessor 150. The monitoring circuit 120 (a control logic 124) outputs a shutdown instruction to the microprocessor 140 and instructs the microprocessor 140 to stop an operation thereof when the watchdog timer 128 is not reset for a predetermined period of time.

Since the configuration shown in FIG. 4 is adopted so that the monitoring circuit 120 can monitor an integrity of the microprocessor 140 and the microprocessor 150, an implementation time of a necessary process can be shortened when common cause failures have occurred in the microprocessors 140 and 150 or the like and thus a controller system 100A can be more safely stopped.

E. Other Application Examples

Although an application example in which abnormality in the power supply portion configured to supply power to the microprocessor is monitored for has been described in the above description, even when the power supply portion supplies power to another device, abnormality can be monitored. Here, since abnormality of the power supply portion does not necessarily directly lead to stoppage of the controller system unlike the power supply portion configured to supply power to the microprocessor, content of a process when abnormality has been detected may be appropriately set depending on usage and an importance of a power supply destination.

To be more specific, for example, the disclosure can be applied to a power supply portion configured to supply power to an actuator operating on the basis of calculation results in microprocessors 140 and 150. In this case, if abnormality occurs in the power supply portion, a monitoring circuit may output a shutdown instruction used to stop the actuator serving as a power supply destination. In addition to this, any of an instruction used to perform a retraction operation, an instruction used to perform only a specific function, and an instruction used to record an event indicating occurrence of abnormality may be output.

As described above, with regard to the monitoring circuit according to the embodiment, various applications are conceivable. In addition, with regard to an operation when abnormality has been detected, various aspects are assumed in accordance with an application. In other words, the monitoring circuit according to the embodiment can be applied to an arbitrary device configuration.

F. Advantages

In the controller system 100 according to the embodiment, as a multiplexed monitoring mechanism, monitoring circuits of two types having different numbers of watchdog timers are used. Each of the monitoring circuits monitors an integrity of power supply of the power supply portion and stops an operation of the microprocessor when abnormality occurs in the power supply portion. Such a structure multiplexes a monitoring mechanism using a plurality of different monitoring circuits so that a likelihood of occurrence of a common cause failure can be reduced.

A multiplexed monitoring mechanism with high reliability in which a likelihood of occurrence of a common cause failure has been reduced as described above is adopted and thus a program executed in the microprocessor need not be in charge of a function of monitoring a power supply portion. In other words, even in a configuration in which a monitoring function is required, difficulty of software development is prevented from increasing and more resources in performance of the microprocessor can be assigned to the original program execution.

Since a separate watchdog timer or the like configured to monitor an operation of the microprocessor is not required either, a circuit configuration can be facilitated and a hardware mounting area can be prevented from enlarging.

All aspects of the embodiments disclosed in this specification are merely exemplified and should be considered not to be restrictive. The scope of the disclosure is indicated through the scope of the claims rather than the above description and is intended as including all modifications within the claims and the equivalent meaning and scope.

What is claimed is:
1. A power supply controller system comprising:
a power supply portion;
a first arithmetic processing portion and a second arithmetic processing portion configured to receive power from the power supply portion and operate; and a first monitoring circuit and a second monitoring circuit configured to monitor an integrity of power supply of the power supply portion, wherein the first monitoring circuit includes a first watchdog timer periodically reset by the first arithmetic processing portion and instructs the second arithmetic processing portion to stop an operation thereof when the first watchdog timer is not reset for a first predetermined period of time, the second monitoring circuit includes a second watchdog timer periodically reset by the second arithmetic processing portion and instructs the first arithmetic processing portion to stop an operation thereof when the second watchdog timer is not reset for a second predetermined period of time, and the first monitoring circuit further includes a third watchdog timer periodically reset by any one of the first arithmetic processing portion and the second arithmetic processing portion and instructs another arithmetic processing portion to stop an operation thereof when the third watchdog timer is not reset for a third predetermined period of time.

2. The power supply controller system according to claim 1, wherein the first monitoring circuit includes a first power supply monitoring portion configured to monitor an integrity of the power supply portion configured to supply power to the first arithmetic processing portion and the second arithmetic processing portion and instructs the first arithmetic processing portion and the second arithmetic processing portion to stop operations thereof if the first power supply monitoring portion detects that an abnormality occurs in the power supply portion, and the second monitoring circuit includes a second power supply monitoring portion configured to monitor an integrity of the power supply portion configured to supply power to the first arithmetic processing portion and the second arithmetic processing portion and instructs the first arithmetic processing portion and the second arithmetic processing portion to stop operations thereof if the second power supply monitoring portion detects that an abnormality occurs in the power supply portion.

3. The power supply controller system according to claim 2, wherein the first power supply monitoring portion and the second power supply monitoring portion are constituted of semiconductor devices manufactured by different processes.

4. The power supply controller system according to claim 1, wherein watchdog timers are not mounted in the first arithmetic processing portion and the second arithmetic processing portion.

5. A semiconductor device which monitors an integrity of power supply of a power supply portion and an integrity of a first arithmetic processing portion and a second arithmetic processing portion in a power supply controller system including the first arithmetic processing portion and the second arithmetic processing portion receiving power from the power supply portion and operating, the semiconductor device comprising:

a first watchdog timer periodically reset by the first arithmetic processing portion;

a second watchdog timer periodically reset by the second arithmetic processing portion;

a power supply monitoring portion configured to monitor an integrity of the power supply portion; and a controller, wherein the controller instructs the second arithmetic processing portion to stop an operation thereof when the first watchdog timer is not reset for a first predetermined period of time, instructs the first arithmetic processing portion to stop an operation thereof when the second watchdog timer is not reset for a second predetermined period of time, and instructs the first arithmetic processing portion and the second arithmetic processing portion to stop operations thereof if the power supply monitoring portion detects that an abnormality occurs in the power supply portion.

* * * * *